US006975852B1

(12) United States Patent
Sofer et al.

(10) Patent No.: US 6,975,852 B1
(45) Date of Patent: Dec. 13, 2005

(54) SYSTEM AND METHOD FOR ROAMING FOR PREPAID MOBILE TELEPHONE SERVICE

(75) Inventors: Carmel Sofer, Mevaseret Zion (IL); Shlomo Wolfman, Hod Hasharon (IL); Ory Biran, Kiriyat Tivon (IL)

(73) Assignee: StarHome GmbH, Zurich (CH)

( * ) Notice: Subject to any disclaimer, the term of this patent is extended or adjusted under 35 U.S.C. 154(b) by 0 days.

(21) Appl. No.: 09/700,547

(22) PCT Filed: Mar. 16, 2000

(86) PCT No.: PCT/IL00/00171

§ 371 (c)(1),
(2), (4) Date: Jan. 29, 2001

(87) PCT Pub. No.: WO00/56085

PCT Pub. Date: Sep. 21, 2000

(51) Int. Cl.[7] ............................................. H04M 11/00
(52) U.S. Cl. ..................... 455/408; 370/352; 370/349; 370/397; 455/406; 455/432.1; 455/433
(58) Field of Search ................................ 455/406, 408, 455/422.1, 432.1, 433, 435.1; 370/352, 349, 370/397

(56) References Cited

U.S. PATENT DOCUMENTS

| 5,796,790 A | 8/1998 | Brunner |
| 5,845,211 A | 12/1998 | Roach, Jr. |
| 5,854,975 A | 12/1998 | Fougnies et al. |
| 5,898,922 A | 4/1999 | Reininghaus |
| 5,920,821 A | 7/1999 | Seazholtz et al. |
| 6,029,062 A | 2/2000 | Hanson |
| 6,047,179 A * | 4/2000 | Kirby .......................... 455/432 |
| 6,075,982 A | 6/2000 | Donovan et al. |
| 6,163,701 A * | 12/2000 | Saleh et al. .................. 455/456 |
| 6,188,752 B1 * | 2/2001 | Lesley ......................... 379/114 |
| 6,389,008 B1 * | 5/2002 | Lupien et al. ............... 370/352 |
| 6,393,269 B1 * | 5/2002 | Hartmaier et al. .......... 455/406 |
| 6,466,783 B2 * | 10/2002 | Dahm et al. ................ 455/414 |
| 6,480,485 B1 * | 11/2002 | Kari et al. ................... 370/352 |

FOREIGN PATENT DOCUMENTS

WO    WO 99/57914    11/1999

OTHER PUBLICATIONS

Global Systems for Mobile Communications, Digital Cellular Telecommunications System (Phase 2+); Customized Applications for Mobile Network Enhanced Logic (CAMEL); Service Definition (Stage 1) (GSM 02.78 Version 5.2.1), Jul. 1997, European Telecommunications Standards Institute.

* cited by examiner

*Primary Examiner*—Charles Appiah
*Assistant Examiner*—Joy Contee
(74) *Attorney, Agent, or Firm*—G.E. Ehrlich (1995) Ltd.

(57) ABSTRACT

A system enables telephony services when roaming in a visited mobile network (108) to a user subscribing to a home mobile network (104) and having a prepaid account with a balance at the home mobile network (104). The system includes a home intelligent gateway (106) integrated into the visited mobile network (108), and a global packet switch network (100) connected to the home intelligent gateway (106) and to the visited intelligent gateway (102). The home intelligent gateway (102) and the visited intelligent gateway (106) are configured to communicate via the global packet switch network (100) in order to manage the telephony services in real-time according to the balance.

13 Claims, 11 Drawing Sheets

SYSTEM AND METHOD FOR ROAMING FOR PREPAID MOBILE TELEPHONE SERVICE

FIELD OF THE INVENTION

The present invention relates to mobile telephone networks, in general, and to providing prepaid mobile station service to users outside of their home mobile network, in particular.

BACKGROUND OF THE INVENTION

Roaming agreements between wireless network operators enable their subscribers to use their mobile telephones when travelling in wireless networks whose operators are party to the agreement. Many wireless network operators offer mobile telephone users the option of being prepaid users. A prepaid user pays in advance for airtime and is given access to the services based on the user's account balance.

A seamless prepaid solution for users of mobile telephones roaming outside of their home mobile network requires access to each user's balance and call control capabilities by the network managing the call. Since operators are reluctant to expose their database to other networks and are missing infrastructure to manage these calls at the visited network, most operators define the prepaid users in a configuration that prevents registration outside the home mobile network.

The SICAP platform available from Swisscom of Switzerland offers prepaid service for outbound roaming. When a prepaid user is registered in a visited location register (VLR), the prepaid user is barred from making calls. To place a call, the user must type in a special Unstructured Supplementary Service Data (USSD) code, followed by the dialed number. The SICAP platform in the home mobile network receives the USSD code and generates a call back to the prepaid user and to the desired destination. This service is not seamless and forces the user to enter codes, which may be difficult to remember and time-consuming and error-prone to enter. The prepaid user's telephone book cannot be used, since a prefix of the USSD code must be added. Most significantly, the prepaid user must wait for the callback and does not receive immediate service.

In some mobile network systems, the handset has a smart card that provides some of the functionality of the handset. In Global System for Mobile communications (GSM), the smart card is called a subscriber identification module (SIM). Some mobile network operators use the SIM toolkit (STK) to produce special SIM "smart cards" which manage the prepaid balance in real time. The SIM on the handset controls the termination of calls depending on the balance stored and can recharge the balance over the air. This service is more sensitive to fraud. Furthermore, it is hard to implement complex tariff tables and hard to differentiate between roaming networks.

Some clearinghouses offer almost real-time balance update, thus enabling control over balance usage. However, there is no guarantee of the call detail record (CDR) delivery time and balance update. Delays cause unauthorized calls after the balance is exhausted.

Some mobile network operators agree to customize their network components in a particular way in order to provide roaming for prepaid users, however this solution is limited only to those operators who are party to the agreement.

The European Telecommunications Standards Institute (ETSI) has set a new GMS standard called Customized Applications for Mobile Networks Enhanced Logic (CAMEL). The standard specifies all the components needed to let GSM network operators offer the intelligent network (IN) services they supply in their home country to subscribers that roam on foreign networks. CAMEL requires an upgrade to the installed mobile network—replacing existing switches and other components with CAMEL-compliant versions. CAMEL also requires the installed mobile network to be integrated with a CAMEL-compliant service control point (SCP). This is an expensive and time-consuming procedure. Mobile network components that are compatible with CAMEL Phase 1 are commercially available and are slowly being introduced into mobile networks. CAMEL-compliant SCPs have had a less successful market penetration, due to the high price tag.

Throughout this specification and claims, the term "partially CAMEL-compliant network" is used to mean a mobile network having CAMEL-compliant versions of standard mobile network components such as switches and location registers but not having a CAMEL-compliant SCP. The term "fully CAMEL-compliant network" is used to mean a mobile network having CAMEL-compliant versions of standard mobile network components such as switches and location registers and having a CAMEL-compliant SCP.

CAMEL Phase 1 enables operators of fully CAMEL-compliant networks to offer simple telephony services to prepaid users who are roaming in a visited fully CAMEL-compliant network. CAMEL Phase 1 does not enable roaming prepaid users to receive home-language announcements or to recharge the account balance during a call without disconnecting the call. Furthermore, when at least one of the home mobile network and the visited network is not fully CAMEL-compliant, then CAMEL Phase 1 does not provide a roaming solution for prepaid users.

SUMMARY OF THE INVENTION

There is provided in accordance with a preferred embodiment of the present invention a system for enabling telephony services when roaming in a visited mobile network to a user subscribing to a home mobile network and having a prepaid account with a balance at the home mobile network. The system includes a home intelligent gateway integrated into the home mobile network, a visited intelligent gateway integrated into the visited mobile network, and a global packet switch network connected to the home intelligent gateway and to the visited intelligent gateway. The home intelligent gateway and the visited intelligent gateway are configured to communicate via the global packet switch network in order to manage the telephony services in real-time according to the balance.

Moreover, in accordance with a preferred embodiment of the present invention, the home mobile network has a prepaid system and the home intelligent gateway includes an interface to the prepaid system.

Furthermore, in accordance with a preferred embodiment of the present invention, the home intelligent gateway retrieves the balance via the interface, calculates an allowed call duration based upon the balance, and transfers the allowed call duration in time units to the visited intelligent gateway via the global packet switch network.

Additionally, in accordance with a preferred embodiment of the present invention, the system further includes a signaling connection control part signal relay point platform integrated into the home intelligent gateway for relaying signaling connection control part messages between the home mobile network and the visited mobile network.

There is also provided in accordance with a preferred embodiment of the present invention a method for enabling telephony services when roaming in a visited mobile network to a user subscribing to a home mobile network and having a prepaid account with a balance at the home mobile network. The method includes the step of communicating via a global packet switch network connecting a home intelligent gateway integrated into the home mobile network and a visited intelligent gateway integrated into the visited mobile network in order to manage the telephony services in real-time according to the balance.

There is also provided in accordance with a preferred embodiment of the present invention a method for registering a user subscribing to a home mobile network and roaming in a visited mobile network. The home mobile network has a home intelligent gateway integrated therein that is connected to a global packet switch network. The method includes the steps of refusing to register the user if the visited mobile network does not have a visited intelligent gateway integrated therein that is connected to the global packet switch network, and registering the user at the visited mobile network if the visited mobile network has a visited intelligent gateway integrated therein that is connected to the global packet switch network.

There is also provided in accordance with a preferred embodiment of the present invention a method for enabling telephony services when roaming in a visited mobile network to a user subscribing to a home mobile network and having a prepaid account with a balance at the home mobile network. The method includes the steps of registering the user in the visited mobile network, and placing mobile originated calls from the visited mobile network if a home intelligent gateway integrated into the home mobile network communicates via a global packet switch network a sufficient allowed call duration to a visited intelligent gateway integrated into the visited mobile network.

Moreover, in accordance with a preferred embodiment of the present invention, the method further including the steps of enabling the user to recharge the balance during a mobile originated call, and enabling the user to continue the mobile originated call if the balance has been sufficiently recharged.

There is also provided in accordance with a preferred embodiment of the present invention a method for enabling telephony services when roaming in a visited mobile network to a user subscribing to a home mobile network and having a prepaid account with a balance at the home mobile network. The method includes the steps of registering the user in the visited mobile network, and placing mobile terminated calls to the visited mobile network if the visited mobile network has a visited intelligent gateway integrated therein that is connected to the global packet switch network.

Moreover, in accordance with a preferred embodiment of the present invention, the method further includes the steps of enabling the user to recharge the balance during a mobile terminated call, and enabling the user to continue the mobile terminated call if the balance has been sufficiently recharged.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention is directed towards a system and method for enabling roaming to prepaid users. According to a preferred embodiment of the present invention, intelligent gateways connected via a global packet switch network are integrated into mobile networks. This configuration has previously been described, although not for the purpose of enabling roaming to prepaid users, in PCT publication WO 99/57914, published Nov. 11, 1999. When a prepaid user subscribing to a home mobile network is roaming in a visited mobile network, the intelligent gateways communicate via the global packet switch network. This communication is used to manage both mobile originated (MO) calls and mobile terminated (MT) calls in real time according to the balance of the prepaid user's account at the home mobile network. This communication is also used to offer advanced services such as home-language announcements and recharging.

Figure 1:
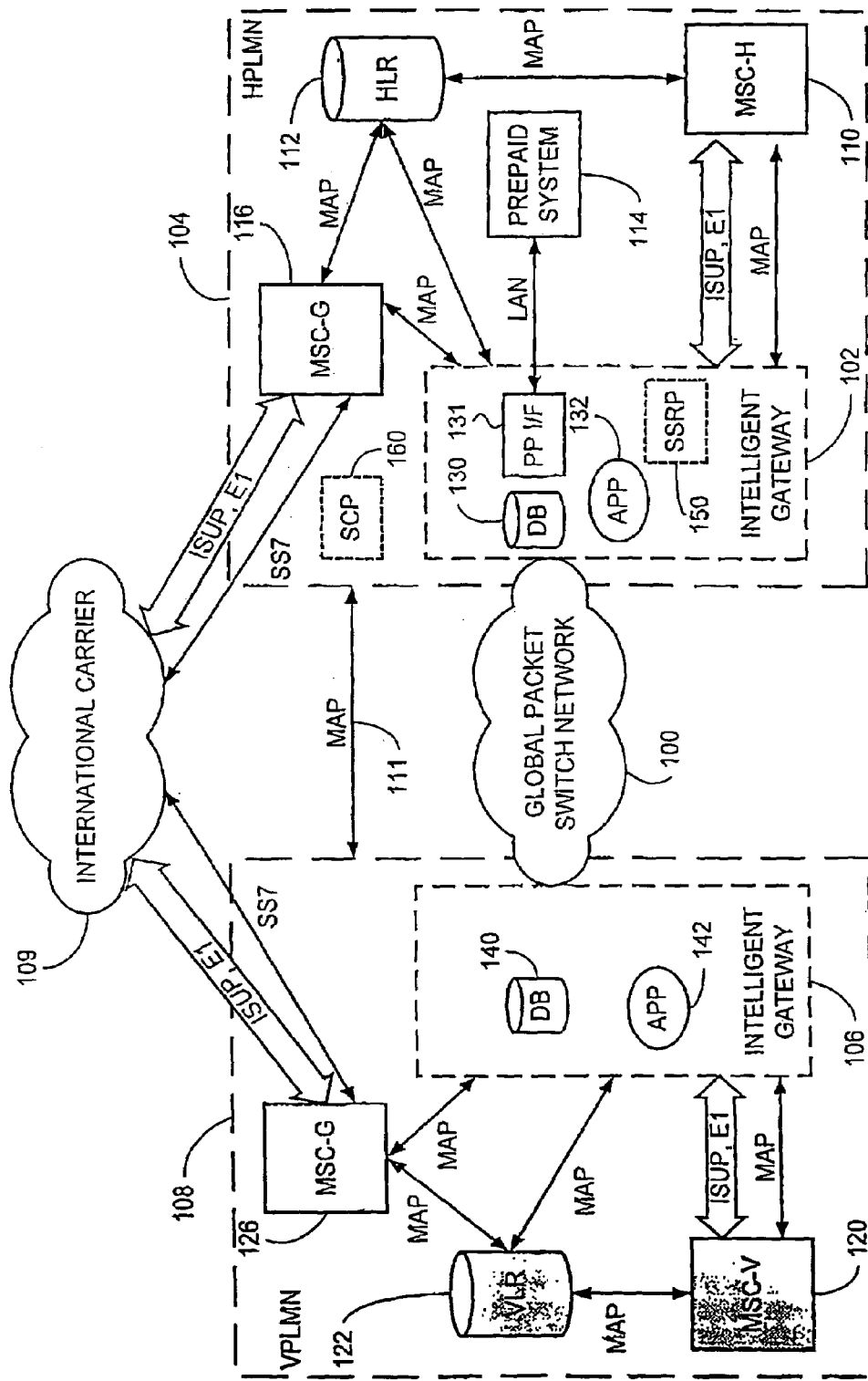
FIG. 1 is a schematic illustration of a system for roaming for prepaid users, according to a preferred embodiment of the present invention.

Reference is now made to FIG. 1, which is a schematic illustration of a system for roaming for prepaid users, according to a preferred embodiment of the present invention. A global packet switch network 100 connects an intelligent gateway (IG) 102, integrated in a home public land mobile network (HPLMN) 104, to an intelligent gateway 106, integrated in a visited public land mobile network (VPLMN) 108. When both HPLMN 104 and VPLMN 108 have intelligent gateways connected via global packet switch network 100, then a prepaid user subscribing to HPLMN 104 is able to roam in VPLMN 108, as will be described in further detail hereinbelow.

The voice path is typically sent over E1/T1 trunks, while signaling related to a particular call is sent using the ISDN user part (ISUP). An international carrier 109 connects HPLMN 104 and VPLMN 108, enabling both a voice path connection and ISUP signaling between HPLMN 104 and VPLMN 108. Signaling related to mobility management is accomplished through the mobile application part (MAP) carried over a backbone network 111. One of the layers under MAP is the signaling connection control part (SCCP).

HPLMN 104 comprises a home mobile switching center (MSC-H) 110 connected to IG 102 via ISUP and E1 connections and via MAP, a home location register (HLR) 112 connected to IG 102 via MAP, a prepaid system 114 connected to IG 102 via a local area network (LAN) connection, and a gateway mobile switching center (MSC-G) 116 connected to international carrier 109 via ISUP and E1 connections.

Similarly, VPLMN 108 comprises a visited mobile switching center (MSC-V) 120 connected to IG 106 via ISUP and E1 connections and via MAP, a visited location register (VLR) 122 connected to IG 106 via MAP, and a gateway mobile switching center (MSC-G) 126 connected to international carrier 109 via ISUP and E1 connections.

It will be appreciated that obviously HPLMN 104 has its own VLR for handling roaming subscribers of other network operators, and that VPLMN 108 has its own HLR for handling its own subscribers, however, these are not referred to in the description of the present invention.

IG 102 comprises a database 130 storing user profile data and possibly a roaming tariffs table, and an application 132 for calculating call durations and for managing calls. IG 102 also comprises a prepaid system interface 131 for interfacing with prepaid system 114. Similarly, IG 106 comprises a database 140 caching user profile data and call duration information and an application 142 for managing calls.

A roaming solution for prepaid users needs to address the following basic functionality: registration, making mobile originated (MO) calls, and receiving mobile terminated (MT) calls. A seamless roaming solution for prepaid users provides in addition to the basic functionality announcements in the user's home language and the possibility of recharging the account balance in the midst of a call.

The preferred embodiments of the present invention described hereinbelow provide seamless roaming solutions for prepaid users in the following scenarios:
 (a) VPLMN 108 is neither fully CAMEL-compliant nor partially CAMEL compliant regardless of the status of HPLMN 104;
 (b) HPLMN 104 is fully CAMEL-compliant and its operator is willing and able to use the service creation environment (SCE) to prepare scripts as part of the seamless roaming for prepaid solution, and VPLMN 108 is either partially CAMEL-compliant or fully CAMEL-compliant;
 (c) HPLMN 104 is partially CAMEL-compliant and VPLMN 108 is either partially CAMEL-compliant or fully CAMEL-compliant;
 (d) HPLMN 104 is neither fully CAMEL-compliant nor partially CAMEL compliant, and VPLMN 108 is either partially CAMEL-compliant or fully CAMEL-compliant; and
 (e) HPLMN 104 is fully CAMEL-compliant but its operator is not willing nor able to use the SCE to prepare scripts as part of the seamless roaming for prepaid solution, and VPLMN 108 is either partially CAMEL-compliant or fully CAMEL-compliant.

In scenarios (b) and (e), where HPLMN 104 is fully CAMEL-compliant, HPLMN 104 comprises a CAMEL-compliant service control point (SCP) 160. In scenarios (a), (c), (d) and (e), IG 102 is integrated with a SCCP signal relay point (SSRP) platform 150, as will be explained hereinbelow.

It will be appreciated that in the specific instances of scenarios (b) and (e) where both HPLMN 104 and VPLMN 108 are fully CAMEL-compliant, a roaming solution for prepaid users exists (using CAMEL Phase 1) without the present invention, but it is primitive and not seamless. The present invention is directed towards providing a seamless roaming solution for prepaid users in these specific instances.

It will also be appreciated that in all other instances, including instances of scenarios (b) and (e) where VPLMN 108 is only partially CAMEL-compliant, no roaming solution for prepaid users exists. The present invention is directed towards providing a seamless roaming solution for prepaid users in these other instances.

A very important feature of the present invention is that it enables a prepaid subscriber of any mobile network having an intelligent gateway connected to global packet switch network 100 to roam in any other mobile network having an intelligent gateway connected to global packet switch network 100. The operators of the mobile networks do not have to make agreements between themselves in order to offer roaming for prepaid subscribers.

Scenario (a)—Registration

Figure 2:
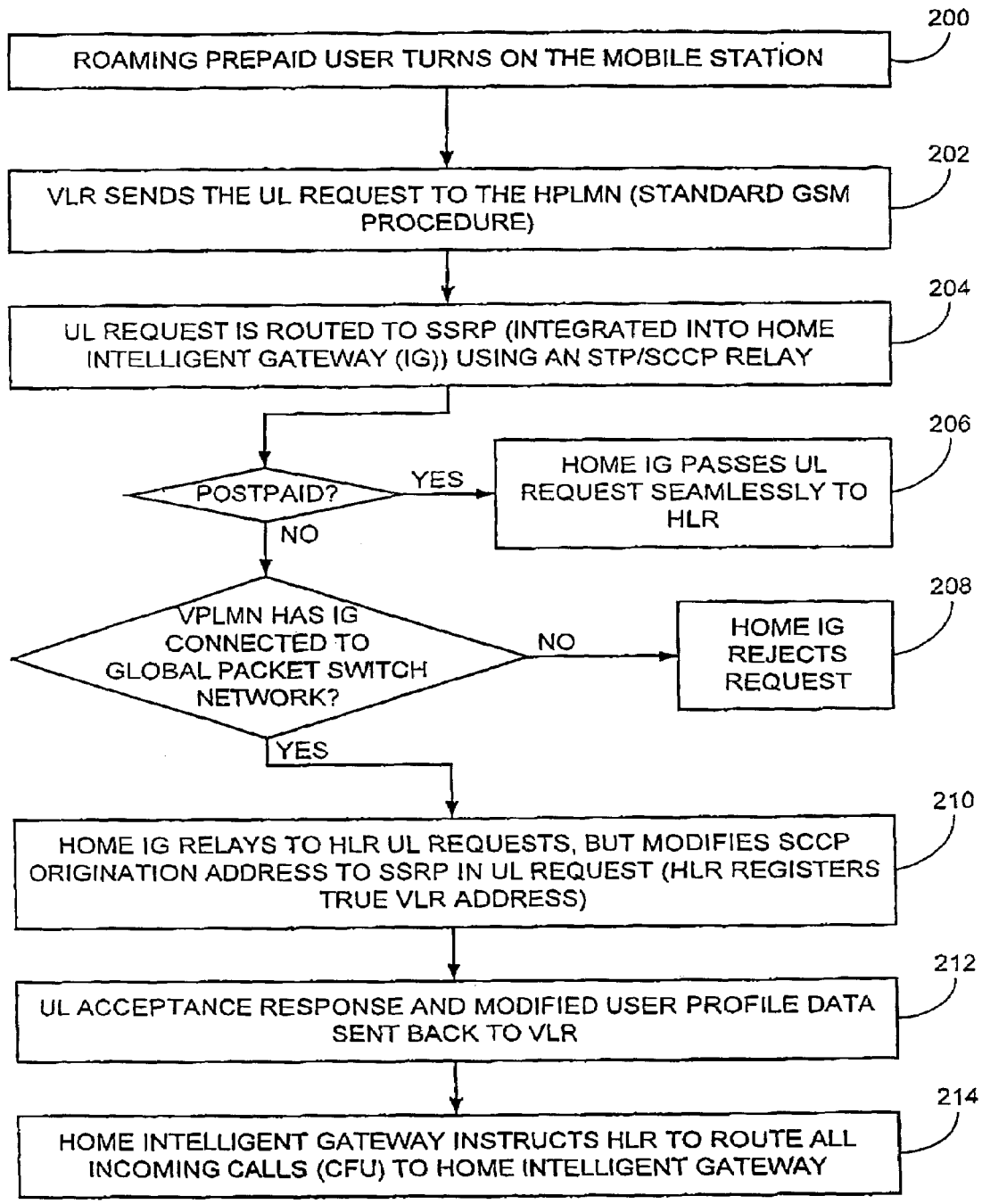
FIG. 2 is a flowchart illustration of a method for registration of a roaming prepaid user, according to a preferred embodiment of the present invention.

Reference is now made to FIG. 2, which is a flowchart illustration of a method for registration of a roaming prepaid user, according to a preferred embodiment of the present invention, applicable to scenario (a). The roaming prepaid user is a subscriber of HPLMN 104 and is visiting in a visited mobile network. The roaming prepaid user turns on the mobile station, which tries to register with the VLR of the visited mobile network (step 200). The VLR sends the update location (UL) request to HPLMN 104 via international carrier 109, following standard GSM procedure (step 202).

MSC-G 116 receives the UL request message from international carrier 109. As mentioned hereinabove, in scenario (a) IG 102 is integrated with SSRP platform 150. MSC-G 116 is configured so that all MGT based messages (authentication and update location processes) are routed to SSRP 150 instead of to HLR 112. As a result, IG 102 receives the UL request message (step 204). IG 102 seamlessly passes on to HLR 112 UL request messages belonging to postpaid users (step 206).

Alternatively, if the operator of HPLMN 104 reserves a special international mobile subscriber identity (IMSI) range for prepaid users, then MSC-G 116 is configured so that MGT based messages based on IMSIs within that range are routed to SSRP 150 instead of to HLR 112. As a result IG 102 receives UL request messages for prepaid users only. This replaces steps 204 and 206.

IG 102 rejects UL requests of prepaid users coming from visited mobile networks not having intelligent gateways, sending the rejection to the VLR via MSC-G 116 (step 208).

For UL requests of prepaid users coming from visited mobile networks having an intelligent gateway, for example VPLMN 108, IG 102 relays to HLR 122 the UL request with a modified SCCP origination address. The modified SCCP origination address is set to SSRP 150, so that HLR 112 thinks that at the SCCP level, the UL request originated at SSRP 150. At TCAP and MAP levels, HLR 112 thinks that the UL request originated at VLR 122. As a result, HLR 112 records the correct address of VLR 112 as the current location of the roaming prepaid user, but all messages relating to this dialogue are now relayed through SSRP 150 (step 210).

HLR 112 sends a UL acceptance response and user profile data back to VPLMN 108 (step 212). As the information passes through SSRP 150, IG 102 is inserts an operator determined barring (ODB) on call forwarding unconditional (CFU) supplementary services. This means that while roaming, the prepaid user cannot change the CFU settings.

Finally, IG 102 issues a CFU command to HLR 112 to route all incoming (mobile terminated) calls to IG 102 (step 214).

Scenario (a)—Mobile Originated (MO) Calls

Figure 3:
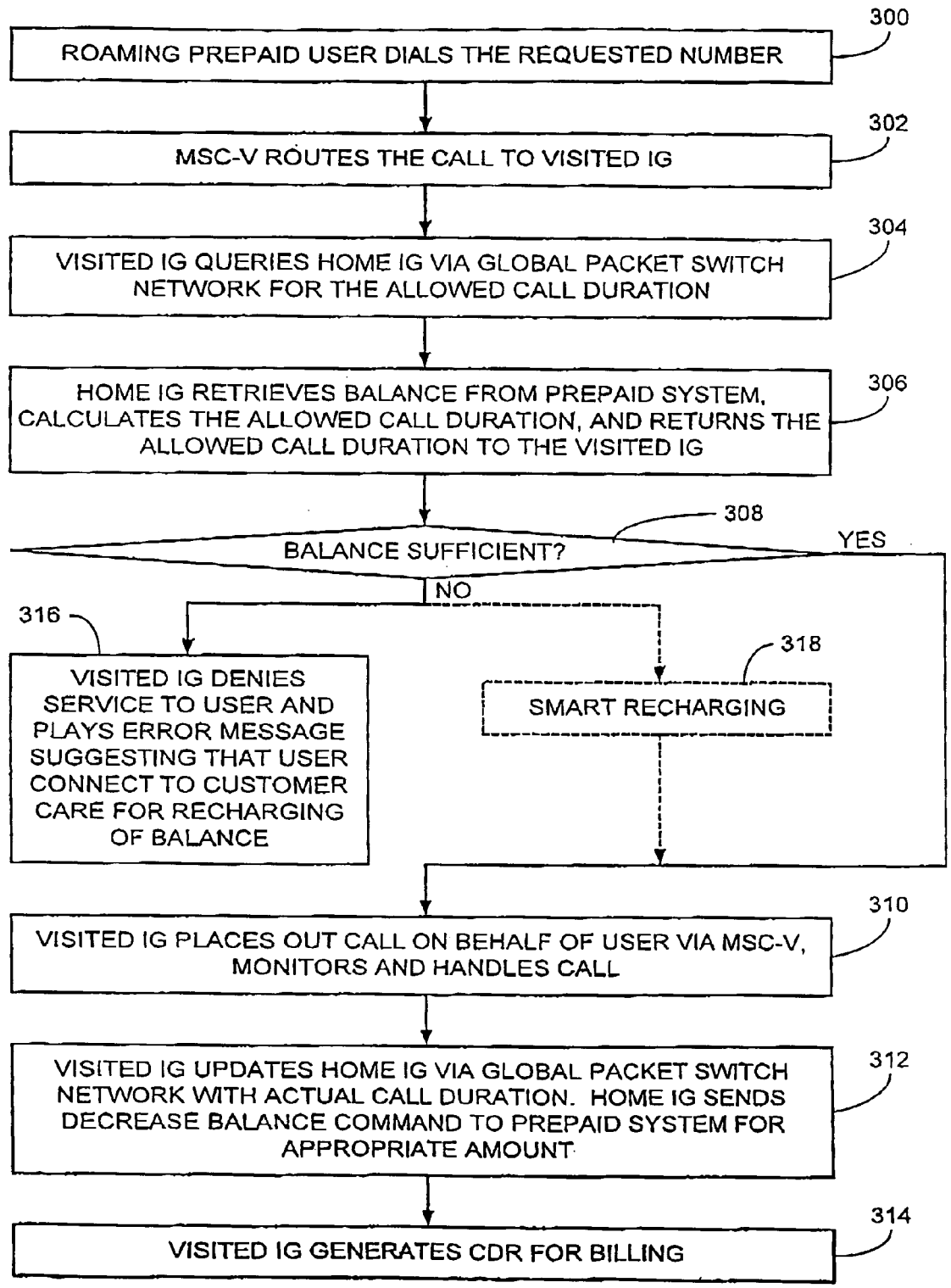
FIG. 3 is a flowchart illustration of a method for enabling a mobile originated (MO) call for a roaming prepaid user, according to a preferred embodiment of the present invention.

Reference is now made to FIG. 3, which is a flowchart illustration of a method for enabling a mobile originated (MO) call for a roaming prepaid user, according to a preferred embodiment of the present invention, applicable to scenario (a). The roaming prepaid user is a subscriber of HPLMN 104 and is visiting in a visited mobile network.

The roaming prepaid user dials the requested number (step 300). Since the roaming prepaid user's mobile station is registered in VLR 122, MSC-V 120 handles the MO call. MSC-V 120 routes the call to IG 106 (step 302).

According to a preferred embodiment of the present invention, HPLMN 104 reserves a special international mobile subscriber identity (IMSI) range for prepaid users, and MSC-V 120 is configured to route all MO calls from roamers having IMSIs within that range to visited IG 106. Alternatively, if VPLMN 108 is equipped with Capability Set 1 (CS1), then MSC-V 120 is configured to query IG 106 using intelligent network application part (INAP) whether the roaming prepaid user is allowed to make an MO call. Alternatively, MSC-V 120 is configured to route all MO calls from roamers subscribing to HPLMN 104 to IG 106. In this last embodiment, IG 106 releases and redirects MO calls from postpaid roamers.

IG 106 queries IG 102 via global packet switch network 100 for the allowed call duration (step 304). IG 102 retrieves the account balance for the prepaid user from prepaid system 114 using prepaid system interface 131, calculates the allowed call duration using tariffs information in database 130, and returns the allowed call duration to IG 106, where it is stored in database 140 (step 306).

IG 106 checks whether the balance is sufficient (step 308). If it is, then IG 106 places the out call on behalf of the prepaid user via MSC-V 120 (step 310). IG 106 retains full control of the MO call. During the call (or at the end of the call), IG 106 updates IG 102 via global packet switch network 100 with the actual call duration. IG 102 calculates the required charge using tariffs information in database 130 and using prepaid system interface 131 sends a decrease balance command to prepaid system 114 for the appropriate amount (step 312). At the end of the call, IG 106 generates a call details record (CDR) for billing (step 314).

If the balance is insufficient, then IG 106 denies the outgoing call service to the prepaid user and plays an error message suggesting that the user connect to customer care for recharging of the balance (step 316). Alternatively, IG 106 could enable the prepaid user to recharge the balance (step 318) and possibly continue with placing the call (step 310) once the balance has been recharged.

Scenario (a)—Mobile Terminated (MT) Calls

Figure 4A:
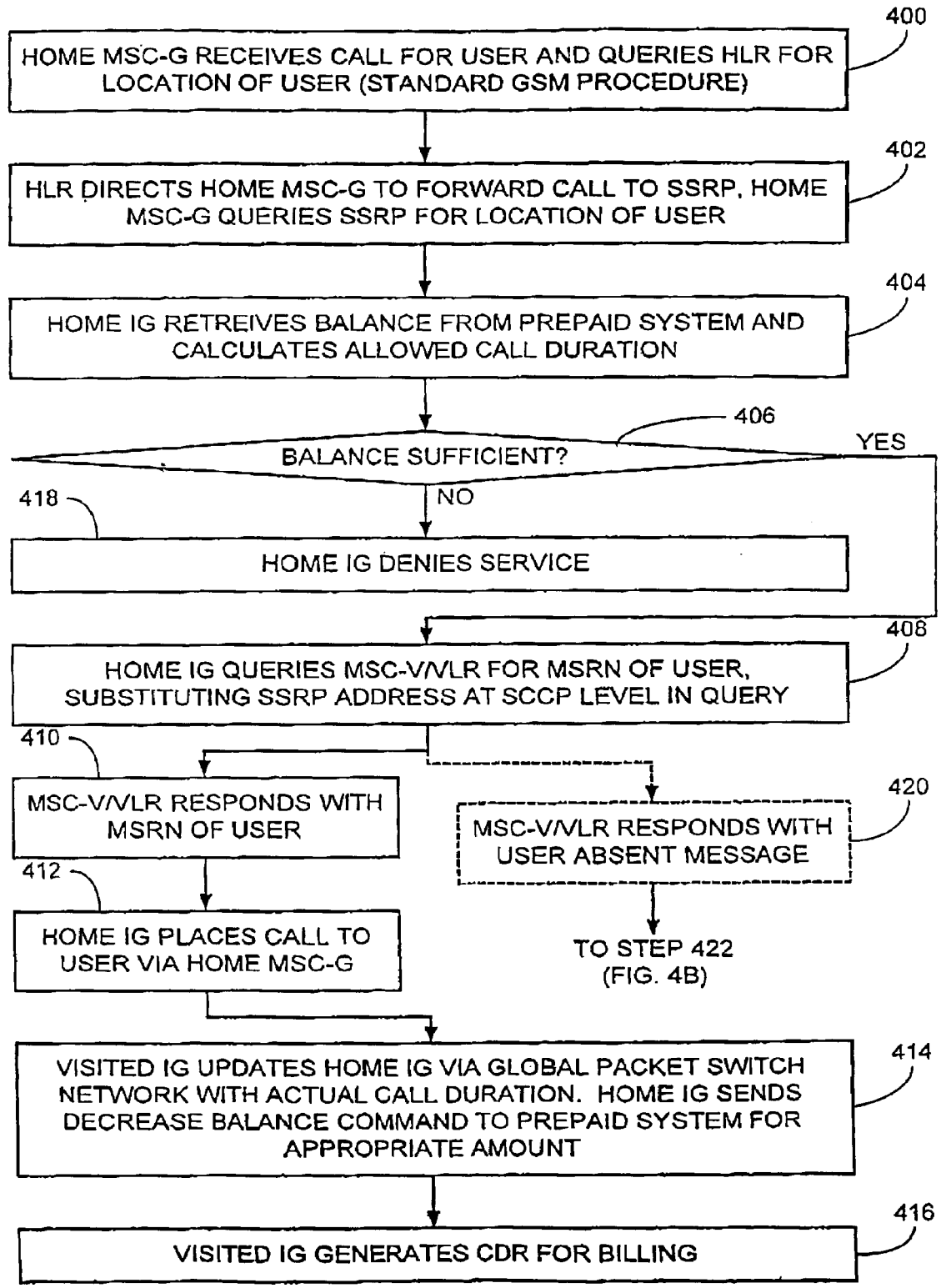
FIGS. 4A and 4B are flowchart illustrations of a method for enabling a mobile terminated (MT) call for a roaming prepaid user, according to a preferred embodiment of the present invention.
Figure 4B:
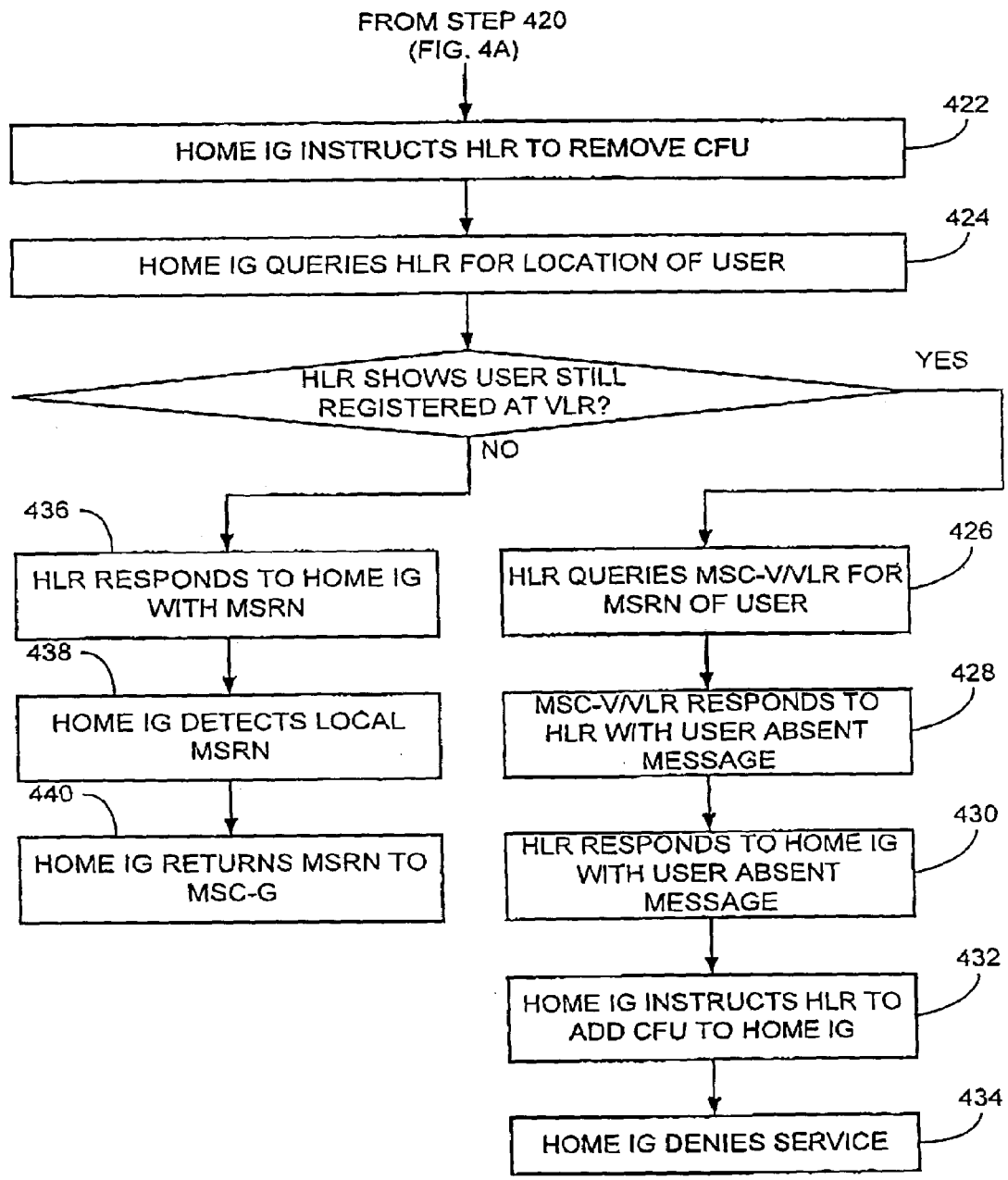

Reference is now made to FIGS. 4A and 4B, which is a flowchart illustration of a method for enabling a mobile terminated (MT) call for a roaming prepaid user, according to a preferred embodiment of the present invention, applicable to scenario (a). The roaming prepaid user is a subscriber of HPLMN 104 and is roaming in VPLMN 108.

MSC-G 116 receives an incoming call for the prepaid user and queries HLR 112 for the user's location, following standard GSM procedure (step 400). Since the user's profile at HLR 112 has a CFU to IG 102 (see FIG. 2, step 214), HLR 112 directs MSC-G 116 to forward the call to IG 102, and MSC-G 116 queries IG 102 for the users location (step 402). IG 102, which has recorded in database 130 that the prepaid user is currently roaming in VPLMN 108, retrieves the current balance from prepaid system 114 and calculates the allowed call duration using tariffs information in database 130 (step 404). IG 102 checks whether the balance is sufficient (step 406). If it is, then IG 102 queries MSC-V 120 and VLR 122 for the mobile station roaming number (MSRN) of the prepaid user, substituting the SS7 address of SSRP 150 at the SCCP level of the query, but retaining the address of HLR 112 at the TCAP and MAP levels (step 408). MSC-V 120 and VLR 122 respond with the MSRN of the prepaid user (step 410). Then IG 102 places the MT call to the user via MSC-G 116 (step 412).

IG 102 retains full control of the MT call. During the call (or at the end of the call), IG 106 updates IG 102 via global packet switch network 100 with the actual call duration. IG 102 calculates the required charge using tariffs information in database 130 and using prepaid system interface 131 sends a decrease balance command to prepaid system 114 for the appropriate amount (step 414). At the end of the call, IG 106 generates a call details record (CDR) for billing (step 416) if the balance is insufficient, IG 102 denies the service (step 418).

Two exceptions for MT calls that need to be dealt with: the roaming prepaid user is detached but is still physically present in the same VPLMN 108; and the prepaid user has returned to HPLMN 104 or has registered in a different visited mobile network. In both of these cases, MSC-V 120 and VLR 122 return a "User Absent" response to IG 102 (step 420). At this point, IG 102 instructs HLR 112 to remove the CFU to IG 102 (step 422). IG 102 then queries HLR 112 for the location of the prepaid user (step 424).

If HLR 112 still shows that the prepaid user is registered in VLR 122, then HLR 112 queries MSC-V 120 and VLR 122 for the MSRN of the prepaid user (step 426). MSC-V 120 and VLR 122 return a "User Absent" response to HLR 112, because the prepaid user is detached (step 428), and HLR 112 responds to the query of step 424 with the "User Absent" response (step 430). IG 102 then restores the CFU at HLR 112 (step 432) and denies the service of an MT call (step 434).

If HLR 112 shows that the prepaid user has returned to the home network, then HLR 112 responds to the query of step 424 with the user's MSRN (step 436). IG 102 recognizes the MSRN as being local (step 438) and returns the MSRN to MSC-G 116 so that the MT call can be placed locally in HPLMN 104 (step 440).

It will be appreciated that although the detailed description hereinabove with respect to scenario (a) is provided for GSM networks, the solutions are equally applicable to non-GSM networks.

Scenarios (b) and (c)—Registration

Figure 5:
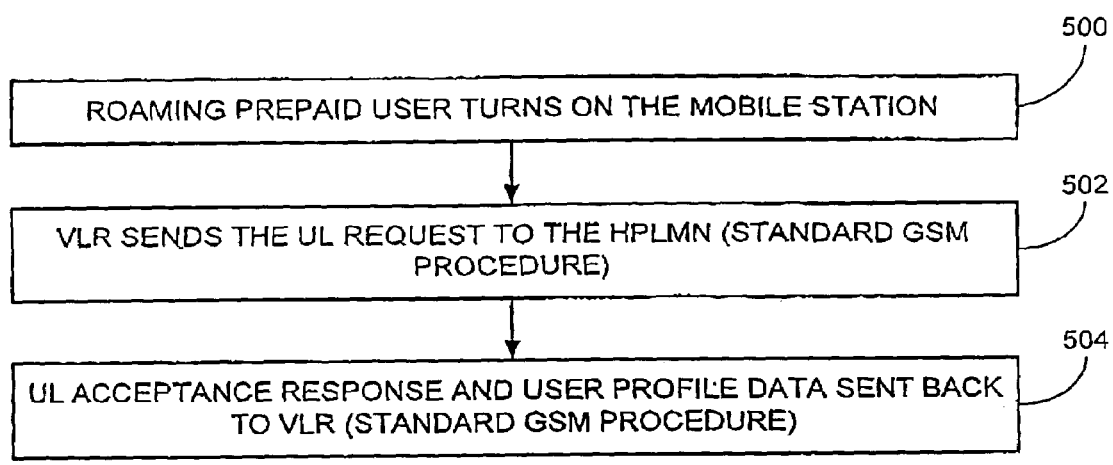
FIG. 5 is a flowchart illustration of a method for registration of a roaming prepaid user, according to another preferred embodiment of the present invention.

Reference is now made to FIG. 5, which is a flowchart illustration of a method for registration of a roaming prepaid user, according to a preferred embodiment of the present invention, applicable to scenarios (b) and (c). The roaming prepaid user is a subscriber of HPLMN 104 and is visiting in a visited mobile network.

As a preliminary requirement, every prepaid user subscribing to HPLMN 104 has origination-CAMEL subscription information (O-CSI) and termination-CSI (T-CSI) records in the user profile data stored in HLR 112. The O-CSI and T-CSI records include a setting of the gsmSCF address to the SS7 address of SCP 160 in the case of scenario (b) and the SS7 address of home IG 102 in the case of scenario (c). The implication of this setting is that every MO and -MT call will trigger a CAP query sent to the component whose address is contained in the gsmSCF variable.

The roaming prepaid user turns on the mobile station, which tries to register with the VLR of the visited mobile network (step 500). The VLR sends the update location (UL) request to HPLMN 104 via international carrier 109, following standard GSM procedure (step 502). All UL requests are accepted and HLR 112 sends a UL acceptance response and user profile data back to VPLMN 108 (step 504).

Scenarios (b) and (c)—Mobile Originated (MO) Calls

Figure 6A:
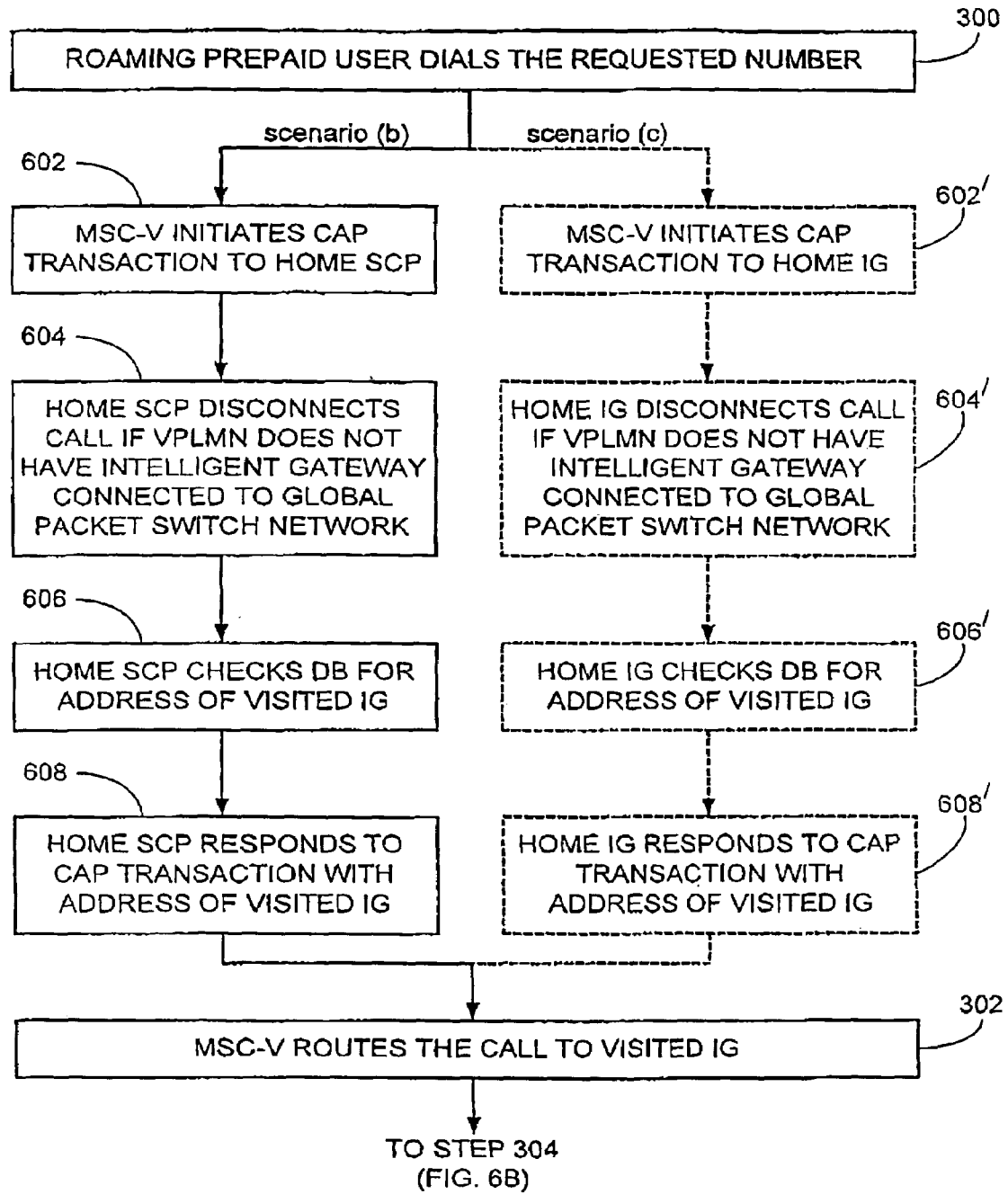
FIGS. 6A and 6B are flowchart illustrations of a method for enabling an MO call for a roaming prepaid user, according to another preferred embodiment of the present invention.
Figure 6B:
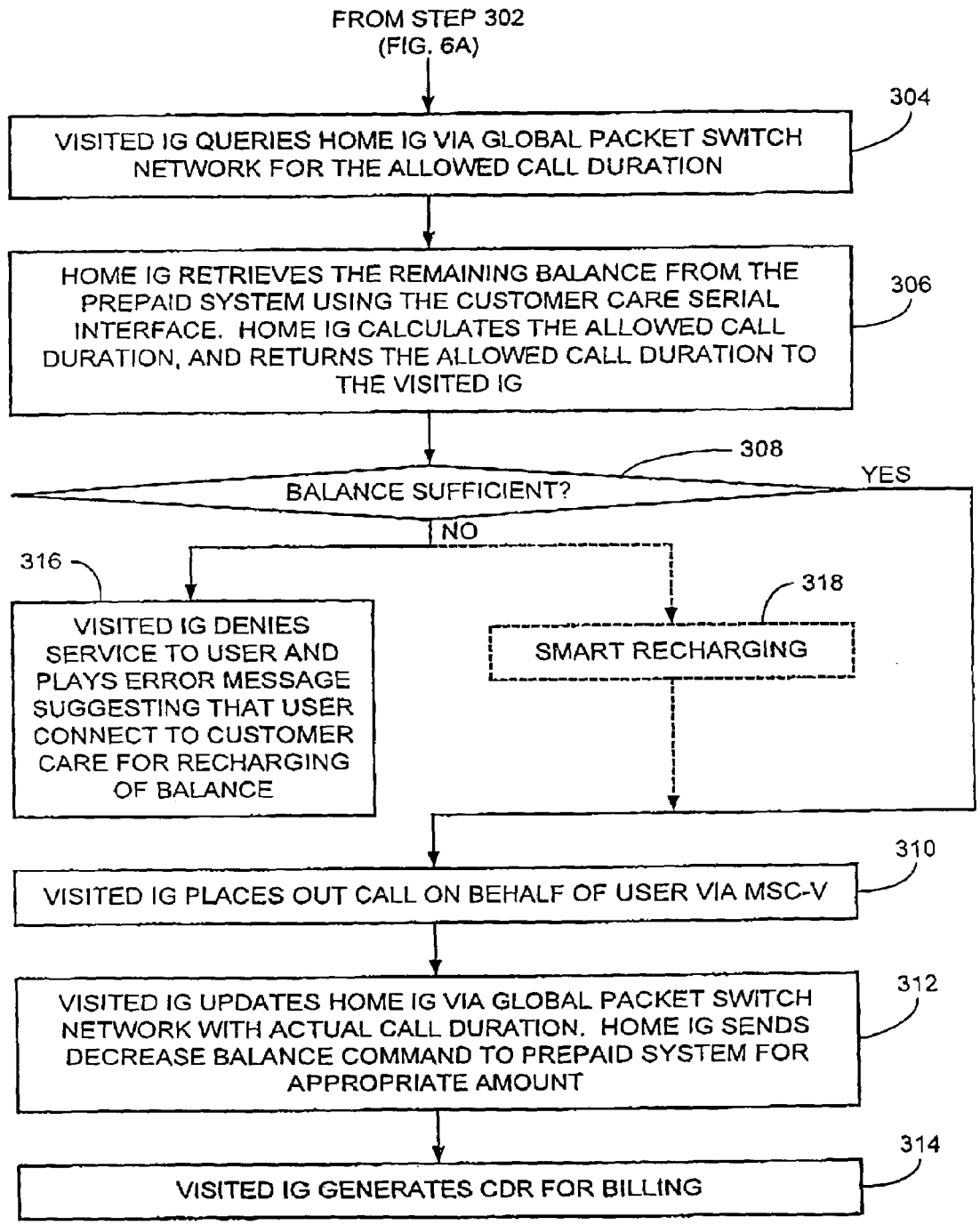

Reference is now made to FIGS. 6A and 6B, which are flowchart illustrations of a method for enabling a mobile originated (MO) call for a roaming prepaid user, according to a preferred embodiment of the present invention, applicable to scenarios (b) and (c). The roaming prepaid user is a subscriber of HPLMN 104 and is visiting in a visited mobile network.

The roaming prepaid user dials the requested number (step 300). Since the roaming prepaid user's mobile station is registered in VLR 122, MSC-V 120 handles the MO call.

In scenario (b), the user profile data stored in VLR 122 has an O-CSI with gsmSCF address set to the address of SCP 160. Therefore MSC-V 120 initiates a CAP transaction to SCP 160 via backbone network 111 (step 602). SCP 160 disconnects the call if the visited mobile network does not have an intelligent gateway (step 604) SCP 160 checks its database for the address of IG 106 (step 606). SCP 160 responds to the CAP transaction of step 602 with the address of IG 106 (step 608). Steps 604–608 require changes to SCP 160 that the operator of HPLMN 104 can accomplish by writing scripts using SCE.

In scenario (c), the user profile data stored in VLR 122 has an O-CSI with gsmSCF address set to the address of IG 102. Accordingly, in scenario (c), steps 602, 604, 606 and 608 are replaced by steps 602', 604', 606' and 608', respectively, with SCP 160 replaced by IG 102.

Then MSC-V 120 routes the call to IG 106 (step 302). From this point on, the MO call is handled as described hereinabove with respect to FIG. 3.

Scenarios (b) and (c)—Mobile Terminated (MT) Calls

Figure 7:
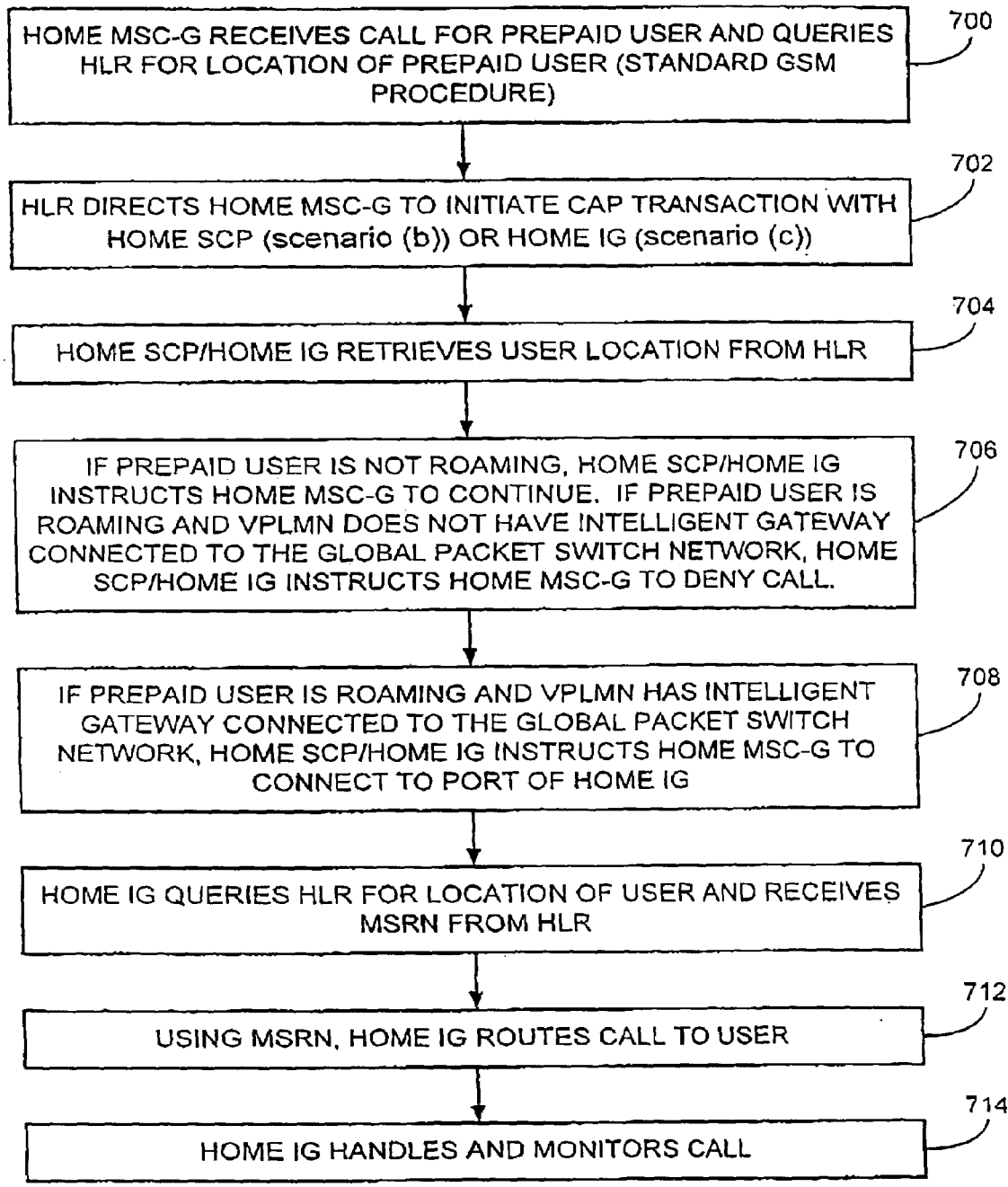
FIG. 7 is a flowchart illustration of a method for enabling an MT call for a roaming prepaid user, according to another preferred embodiment of the present invention.

Reference is now made to FIG. 7, which is a flowchart illustration of a method for enabling a mobile terminated (MT) call for a roaming prepaid user, according to a preferred embodiment of the present invention, applicable to scenarios (b) and (c). The roaming prepaid user is a subscriber of HPLMN 104 and is roaming in VPLMN 108.

MSC-G 116 receives an incoming call for the prepaid user and queries HLR 112 for the user's location, following standard GSM procedure (step 700). In scenario (b), the user profile data stored in HLR 112 has a T-CSI with gsmSCF address set to the address of SCP 160. In scenario (c), the user profile data stored in HLR 112 has a T-CSI with gsmSCF address set to the address of IG 102. Therefore HLR 112 directs MSC-G 116 to initiate a CAP transaction with SCP 160 for scenario (b) and IG 102 for scenario (c) (step 702).

SCP 160 (IG 102) retrieves the location of the user (which, if the user is roaming, is the address of VLR 122) from HLR 112 (step 704). In some configurations, HLR 112 includes the location of the user in its response to MSC-G 116 in step 702. If this does not automatically happen, then it is possible to turn on the Location Information Interrogation Indicator in the prepaid user's profile in HLR 112 so that HLR 112 is forced to include the location of the user in its response to MSC-G 116 in step 702. Alternatively, SCP 160 (IG 102) queries HLR 112 directly for the user's location.

SCP 160 (IG 102) checks whether the prepaid user is roaming. If not, SCP 160 (IG 102) instructs MSC-G 116 to continue to place the call via MSC-H 110. However, if the prepaid user is roaming in a visited network which does not have an intelligent gateway connected to global packet switch network 100, then SCP 160 (IG 102) instructs MSC-G 116 to deny the call (step 706).

Otherwise, SCP 160 (IG 102) instructs MSC-G 116 to connect to a port of IG 102 (step 708). Then IG 102 queries HLR 112 with a T-CSI suppressed query for the location of the prepaid user and receives an MSRN (step 710). Using the MSRN, IG 102 routes the MT call to the user (step 712) while handling and monitoring the call (step 714). While handling the call, IG 102 can provide announcements and/or tones at every stage of the call, advanced recharging capabilities, etc.

Scenario (d)—Registration

Registration in scenario (d) is performed according to the method described hereinabove with respect to FIG. 2, with the following changes. In step 212, HLR 112 sends a UL acceptance response and user profile data back to VPLMN 108. As the information passes through SSRP 150, IG 102 inserts an operator determined barring (ODB) on call forwarding unconditional (CFU) supplementary services. This means that while roaming, the prepaid user cannot change the CFU settings. IG 102 also inserts an O-CSI record in the user profile data sent back to VPLMN 108. This O-CSI record includes a setting of the gsmSCF address to the SS7 address of IG 102 or 106. The implication of this setting is that every MO call will trigger a CAP query sent to the component whose address is contained in the gsmSCF variable. Setting gsmSCF to IG 106 is more cost-effective than setting gsmSCF to IG 102, but the technical solution is the same:

Scenario (d)—Mobile Originated (MO) Calls

Figure 8A:
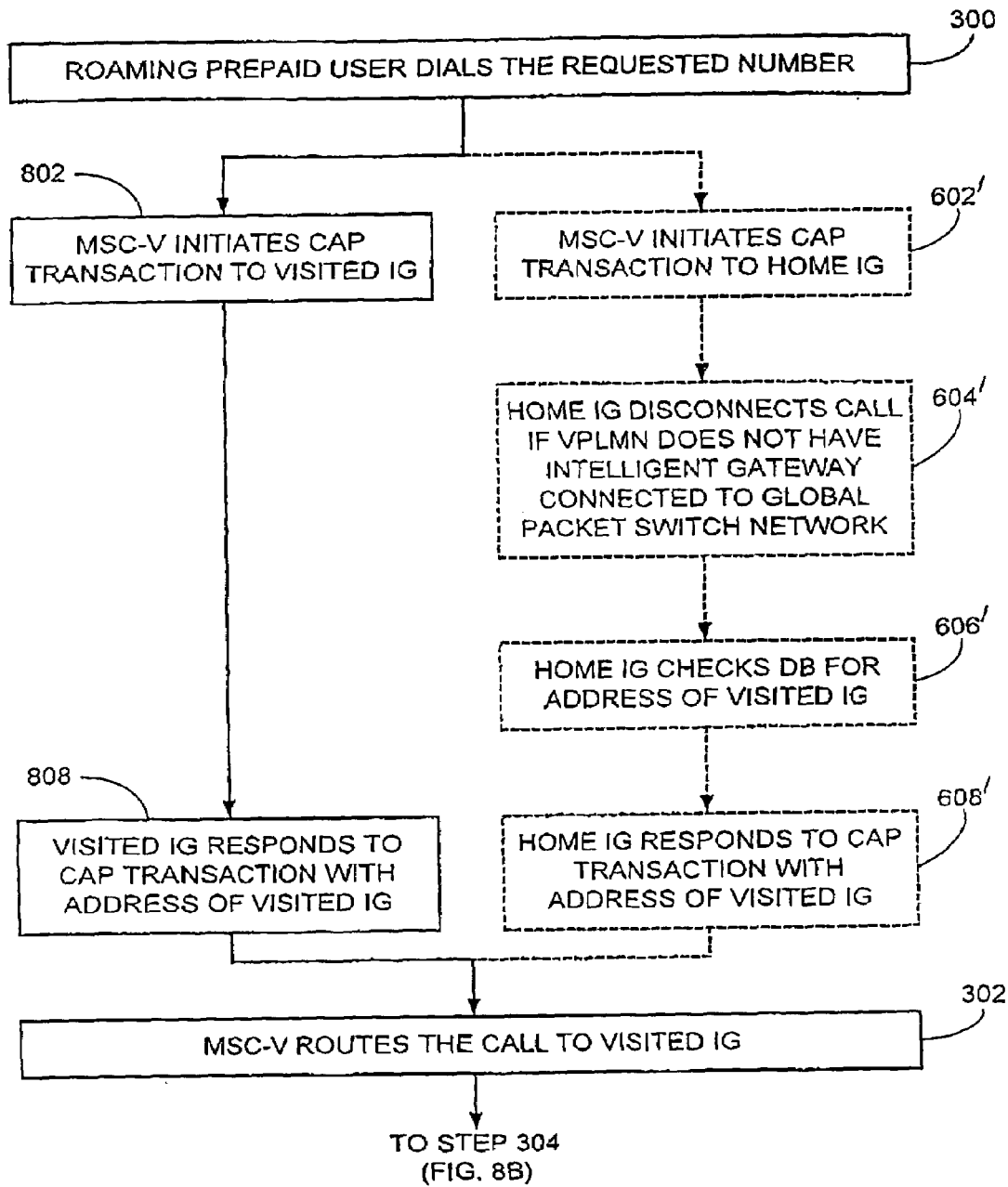
FIGS. 8A and 8B are flowchart illustrations of a method for enabling an MO call for a roaming prepaid user, according to yet another preferred embodiment of the present invention.
Figure 8B:
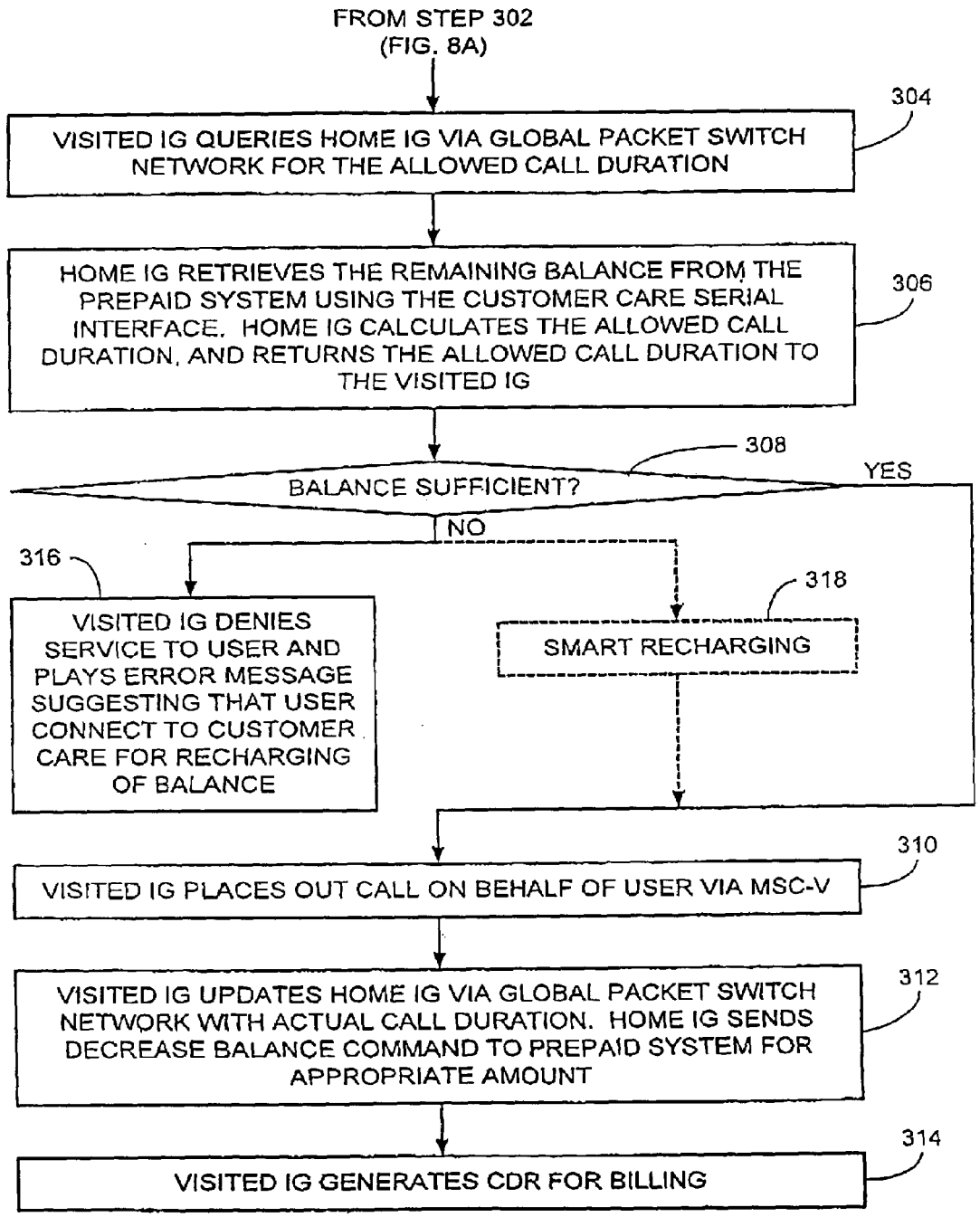

Reference is now made to FIGS. 8A and 8B, which are flowchart illustrations of a method for enabling a mobile originated (MO) call for a roaming prepaid user, according to a preferred embodiment of the present invention, applicable to scenario (d). The roaming prepaid user is a subscriber of HPLMN 104 and is visiting in a visited mobile network.

The roaming prepaid user dials the requested number (step 300). Since the roaming prepaid user's mobile station is registered in VLR 122, MSC-V 120 handles the MO call.

In scenario (d), the user profile data stored in VLR 122 has an O-CSI with gsmSCF address set to the address of either IG 102 or IG 106. In the case of IG 102, the method continues from step 602' as described hereinabove with respect to FIG. 6. In the case of IG 106, MSC-V 120 initiates an internal CAP transaction to IG 106 (step 802). IG 106 responds to the CAP transaction with instructions to MSC-V 120 to route the call to IG 106 (step 808). The method continues from step 302 as described hereinabove with respect to FIG. 3.

Scenario (d)—Mobile Terminated (MT) Calls

Mobile Terminated calls in scenario (d) are performed according to the method described hereinabove in FIGS. 4A and 4B.

Scenario (e)—Registration

Registration in scenario (e) is performed according to the method described hereinabove with respect to FIG. 2, with the following changes. In step 212, HLR 112 sends a UL acceptance response and user profile data back to VPLMN 108. As the information passes through SSRP 150, IG 102 inserts an O-CSI record and a T-CSI record in the user profile data sent back to VPLMN 108. The O-CSI and T-CSI records include a setting of the gsmSCF address to the SS7 address of IG 102. The implication of this setting is that every MO and MT call will trigger a CAP query to IG 102. Alternatively, for a more cost-effective solution, the O-CSI record could include a setting of the gsmSCF address to the SS7 address of IG 106.

According to a preferred embodiment of the present invention, instead of having IG 102 insert the O/T-CSI records, these records are provided as a preliminary requirement for every prepaid user subscribing to HPLMN 104.

Scenario (e)—Mobile Originated (MO) Calls

Mobile Originated calls in scenario (e) are performed according to the method described hereinabove in FIGS. 8A and 8B.

Scenario (e)—Mobile Terminated (MT) Calls

Mobile Terminated calls in scenario (e) are performed according to the method described hereinabove in FIG. 7, where the CAP transactions are initiated to IG 102, as in scenario (e).

Phone-Less Roaming

According to another aspect of the present invention, a prepaid user roaming in a visited mobile network having an intelligent gateway connected to global packet switch network 100 is able to make calls even without having the mobile station. The user profile data at the home intelligent gateway includes a roaming password for this purpose. When situated outside of HPLMN 104, the prepaid user calls a common access number, provides the mobile station international subscriber directory number (MSISDN) and a roaming password, and if authorized, uses the balance to place calls from any telephone.

Prepaid System Interface

As described hereinabove, after IG 106 queries IG 102 via global packet switch network 100 for the allowed call duration, IG 102 retrieves the account balance for the prepaid user from prepaid system 114 using prepaid system interface 131, calculates the allowed call duration using tariffs information in database 130, and returns the allowed call duration to IG 106.

Prepaid system interface 131 enables IG 102 to retrieve a user balance and to decrease a user balance by a given monetary amount, regardless of the is vendor of prepaid system 114, the basic architecture and the currency. If prepaid system 114 manages the roaming tariff table internally, then database 130 does not store a roaming tariffs table, and prepaid system interface 131 enables IG 102 to query prepaid system 114 for the relevant tariff.

Preferably, prepaid system interface 131 uses the administrative customer care call center system local area network (LAN) protocol. Alternatively, if prepaid system 114 is intelligent network (IN) based, an IN application part (INAP) interface can be used, although the same LAN connection will suffice. If an INAP interface is used, then application 132 is capable of presenting IG 102 to prepaid system 114 as a service switching function (SSF) and a visited mobile switch center using an SS7 address, and is capable of handling INAP commands and a session between IG 102 and prepaid system 114.

Tariffs Handling

IG 102 is able to support separate roaming tariff tables for each visited network. Each table can support several tariff profiles to be chosen from according to the user profile, time of day and date. Since it is per network based, the time difference between networks can be embedded seamlessly using the home time as a baseline (unless the visited network covers multiple time zones). Each tariff profile includes at least the following fields: initial charge unit length, initial charge unit rate, additional charge unit length and additional charge unit rate. Application 132 uses both charges to calculate allowed call duration and amount of credit consumed de facto.

Security

Since the present invention involves real-time charging and money storage and control, it needs to be secured in a way that does not expose the prepaid user accounts to additional risks. Furthermore, the present invention should be designed in such a way so that the tariffs and policies of HPLMN 104 are hidden from visited mobile networks.

Therefore, according to a preferred embodiment of the present invention, the visited IG 106 caches an identification of the prepaid user and the user's profile data. Furthermore, the user's balance is never cached in any intelligent gateway. Rather, a retrieved balance is used for a real-time calculation of allowed call duration and then immediately deleted from the intelligent gateway's application 132. If for seamless usage it is required to start the session faster than the response time of prepaid system 114, it is recommended to do so by allocating a grace period until the real balance is obtained rather than caching the last call's remaining balance. The algorithm may be improved by an additional flag (go/no go only) calculated after the last call from the remaining balance and safety interval chosen by the operator of HPLMN 104. Finally, both intelligent gateways can query or update each other only by time units, i.e. the call duration will always be calculated at the home network and balance updates will always be stated in time units at the visited IG and translated to local currency only at the home IG.

Fraud Prevention

Basic fraud prevention capabilities should be incorporated into the present invention:
  A prepaid user is not allowed to maintain more than a single telephone call at a given time.
  A prepaid user is not allowed to place or receive consecutive telephone from or to visited mobile networks unless a reasonable time has elapsed. This functionality will be setup in the home intelligent gateway according to the preferences of the home network operator.
  A prepaid user is not allowed to consume more than M amounts of money in less than T seconds (where M and T are system parameters) as well as an optional limit on the call duration of a single call.

In addition, a commercially available fraud prevention utility (profiler) can be added to the system to prevent illegal exploiation of the access to the prepaid system. The profiler uses activity records provided by the roaming for prepaid application and the billing CDRs as well as global information available from the users' location database to efficiently protect the system from malicious usage. When fraud or any other malicious activity is suspected, the home network should issue an appropriate warning. All incoming calls should then be rejected and outgoing calls should be routed to the customer care regardless of the destination number.

It will be appreciated by persons skilled in the art that the present invention is not limited by what has been particularly shown and described herein above. Rather the scope of the invention is defined by the claims that follow:

What is claimed is:

1. A system for enabling telephony services when roaming in a visited mobile network to a user subscribing to a home mobile network and having a prepaid account with a balance at said home mobile network, the system comprising:
   a home intelligent gateway integrated into said home mobile network, wherein said home mobile network is configured to direct signaling messages for events associated with roaming prepaid subscribers to said home intelligent gateway;
   a visited intelligent gateway integrated into said visited mobile network; and
   a global packet switch network connected to said home intelligent gateway and to said visited intelligent gateway,
   said home intelligent gateway and said visited intelligent gateway configured to communicate management information via said global packet switch network in order to manage said telephony services in real-time according to said balance, thereby controlling a duration of said telephony event at said visited mobile network via said communicated information.

2. The system of claim 1, wherein said home mobile network has a prepaid system and said home intelligent gateway includes an interface to said prepaid system.

3. The system of claim 2, wherein said home intelligent gateway is configured to retrieve said balance via said interface, to calculate an allowed call duration based upon said balance, and to transfer said allowed call duration in time units to said visited intelligent gateway via said global packet switch network.

4. The system of claim 1, wherein said system further comprises a signaling connection control part signal relay point platform integrated into said home intelligent gateway for relaying signaling connection control part messages between said home mobile network and said visited mobile network.

5. A method for enabling telephony services when roaming in a visited mobile network to a user subscribing to a home mobile network and having a prepaid account with a balance at said home mobile network, the method comprising the steps of:
   configuring said home mobile network to direct signaling messages for events associated with a prepaid user to a home intelligent gateway integrated into said home mobile network, upon notification that said prepaid user is roaming in said visited mobile network; and
   communicating call management information via a global packet switch network connecting said home intelligent gateway and a visited intelligent gateway integrated into said visited mobile network in order to control a duration of said telephony event at said visited mobile network via said communicated information in real-time according to said balance.

6. The system of claim 1, wherein control of said call is through said home mobile network.

7. The system of claim 6, wherein said call terminates at said roaming prepaid subscriber.

8. The system of claim 1, wherein control of said call is through said visited mobile network.

9. The system of claim 8, wherein said call originates from said roaming prepaid subscriber.

10. A method for configuring a home mobile network so as to enable telephony services when roaming in a visited mobile network to a user subscribing to said home mobile network and having a prepaid account with a balance at said home mobile network, the method comprising the steps of:
    receiving a location update message for said user from said visited mobile network;
    updating a location registry of said home mobile network to the location specified in said location update message;
    configuring said home mobile network to direct call management messages for said user to an integrated home intelligent gateway;
    communicating call management information between said home intelligent gateway and a visited intelligent gateway integrated into said visited mobile network via a global packet switch network in order to control a duration of said call in real-time according to said balance.

11. A system for enabling telephony services when roaming in a visited mobile network to a user subscribing to a home mobile network and having a prepaid account with a balance at said home mobile network, the system comprising:
    a home intelligent gateway integrated into said home mobile network, wherein said home mobile network is configured to include an address of said home intelligent gateway in a user profile for prepaid users;
    a visited intelligent gateway integrated into said visited mobile network; and
    a global packet switch network connected to said home intelligent gateway and to said visited intelligent gateway,
    said visited intelligent gateway being configured to query said home intelligent gateway at said included address for authorization of calls associated with said roaming user, and wherein said home intelligent gateway is operable to communicate call management information via said global packet switch network to said visited gateway in response to said query in order to manage said telephony services in real-time according to said balance, thereby controlling a duration of said call at said visited mobile network via said communicated information.

12. A method for registering a roaming prepaid user at a visited mobile network, said user subscribing to a home mobile network and roaming in a visited mobile network, said home mobile network not being CAMEL compliant, said home mobile network having a home intelligent gateway integrated therein that is connected to a global packet switch network, the method comprising the steps of:
    configuring said home mobile network to direct messages updating a location of roaming prepaid users to said home intelligent gateway;
    receiving a message updating a location of said roaming prepaid user from said visited network;
    directing said received message to said home intelligent gateway; and
    modifying a home network messaging address to direct further call management messages for calls associated with said roaming user to said home intelligent gateway.

13. The method of claim 12, further comprising sending location update acknowledgement and a user profile to said visited network.

* * * * *